US008275880B2

(12) United States Patent
Allard et al.

(10) Patent No.: US 8,275,880 B2
(45) Date of Patent: Sep. 25, 2012

(54) MEDIA CONTENT PROGRAMMING, DELIVERY, AND CONSUMPTION

(75) Inventors: James E. Allard, Seattle, WA (US);
Anton O. Andrews, Seattle, WA (US);
Julio Estrada, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 12/115,557

(22) Filed: May 6, 2008

(65) Prior Publication Data
US 2009/0282093 A1 Nov. 12, 2009

(51) Int. Cl.
*G06F 15/16* (2006.01)
*G06F 15/173* (2006.01)
*G06F 15/177* (2006.01)
(52) U.S. Cl. ....................................... 709/224; 709/217
(58) Field of Classification Search .................. 709/224
See application file for complete search history.

(56) References Cited

U.S. PATENT DOCUMENTS

| | | | |
|---|---|---|---|
| 6,139,329 A | 10/2000 | Mino et al. | |
| 6,933,433 B1 | 8/2005 | Porteus et al. | |
| 7,017,120 B2 | 3/2006 | Shnier | |
| 2002/0078029 A1 | 6/2002 | Pachet | |
| 2002/0152278 A1* | 10/2002 | Pontenzone et al. | 709/217 |
| 2002/0166119 A1 | 11/2002 | Cristofalo | |
| 2006/0069724 A1 | 3/2006 | Langdon | |
| 2007/0039031 A1 | 2/2007 | Cansler et al. | |
| 2007/0079352 A1* | 4/2007 | Klein, Jr. | 715/500.1 |
| 2007/0220552 A1 | 9/2007 | Juster et al. | |
| 2007/0243509 A1 | 10/2007 | Stiebel | |
| 2008/0091717 A1 | 4/2008 | Garbow et al. | |
| 2008/0134043 A1* | 6/2008 | Georgis et al. | 715/733 |
| 2008/0155470 A1* | 6/2008 | Khedouri et al. | 709/224 |
| 2009/0056525 A1* | 3/2009 | Oppenheimer | 84/609 |

FOREIGN PATENT DOCUMENTS

| | | |
|---|---|---|
| KR | 10-0571347 | 4/2006 |
| KR | 10-2007-023953 | 3/2007 |
| WO | WO 2007-092053 | 8/2007 |

OTHER PUBLICATIONS

"Transfer Music to a Portable Device", http://help.yahoo.com/l/us/yahoo/music/jukebox/portdevices/tasks_transfer01.html.
International Search Report regarding International Application No. PCT/US2009/039699 dated Dec. 1, 2009.

(Continued)

*Primary Examiner* — Haresh N Patel
*Assistant Examiner* — Chau Le
(74) *Attorney, Agent, or Firm* — Wolfe-SBMC

(57) ABSTRACT

A media content programming, delivery, and consumption model is provided by which consumers can receive programming that is personalized to their tastes and interests and discover new media content that they will likely enjoy, without having to put in a lot of effort or needing to be technically adept. The received media content programming can then be played on a PC or portable media player. Consumers can access the media content programming from a cloud-based service with the same ease as tuning to a radio station, and then may simply enjoy the programming without needing to take any additional steps. However, unlike traditional linear programming, the programming here is curated so that the delivered content is highly relevant to the consumer. Navigation within a programmed sequence is enabled by skipping ahead or going back in a playlist, and consumers can learn more about particular content by interacting with rich metadata.

18 Claims, 6 Drawing Sheets

OTHER PUBLICATIONS

"Extended European Search Report", European Patent Application No. 09743193.6, (Jul. 7, 2011), 9 pages.

"Foreign Office Action", Chinese Application No. 200980116679.8, (Dec. 13, 2011), 6 pages.

"Foreign Office Action", European Patent Application No. 09743193.6, (Jan. 23, 2012), 5 pages.

Peter V. Mikhalenko "Compose Music like a Pro: Rapid Music Programming with Java JFugue", Aug. 11, 2006, pp. 1-6.

Freed, et al., "Music Programming with the new Features of Standard C++", 1998, pp. 1-6.

Eli Brandt, "Temporal Type Constructors for Computer Music Programming", Proc. ICMC '00, pp. 1-4.

"Transfer Music to a Portable Device", http://help.yahoo.com/l/us/yahoo/music/jukebox/portdevices/tasks_transfer01.html. , 2007, pp. 1-3.

"European Search Report", Mailed Date: Jul. 8, 2011, Application No. EP/09743193 , Filed Date: Jul. 7, 2011, pp. 9.

* cited by examiner

MEDIA CONTENT PROGRAMMING, DELIVERY, AND CONSUMPTION

BACKGROUND

Traditionally delivered media content, such as broadcast radio and television, follows a linear programming model by which service providers supply multiple discrete streams or channels of programming to a population of consumers. Consumers (i.e., listeners or viewers) select among the channels to tune to the stream of media content they wish to consume. Within each stream, the media content is programmed to be delivered in a particular way, so that, for example, a given television show runs at certain times, songs are played according to a particular playlist, advertisements are run on some set schedule, and so forth. While consumers can sometimes use time shifting devices such as recorders to consume a particular piece of media content within a programmed stream at a time of their choosing, consumers cannot choose or control which media content is played, or when, within a linear program stream. So if the consumer wants to watch or listen to something else, they will typically switch to another television channel or tune to another radio station.

The linear programming model is being supplemented, and for some consumers, being replaced by interactive (i.e., non-linear) access to media content. Common examples of interactive access include Video-on-Demand television and on-line media content delivery to a home PC (personal computer). In both examples, consumers can choose a particular piece of media content (like a song, audio book, music video, television show, or movie, etc.,) that can be consumed at a desired time. New business models have also been introduced that enable consumers to purchase media content from on-line sources, share the content with other consumers, or transfer content to devices such as portable media players. In short, interactive access has provided consumers with flexible ways to personalize their selection and consumption of media content that has proven to be both popular and commercially successful.

While interactive access to media content has dramatically changed the way consumers can access and consume content, traditional linear programming still remains a preferred choice for many consumers. Some like the unattended way linear programmed media content is delivered because it is does not take a lot of effort or particular technical skill to find and access media content that can be enjoyed. Other consumers may develop an affinity for a particular channel or station. Using radio as an example, a listener might have a favorite station that is tuned into regularly because the listener likes the mix of music or other programming that is played, or they have a favorite DJ or on-air personality at the station. Other listeners may like the fact that they can count on being introduced to new artists or songs that they will like when they are listening to a radio station that plays music they already like. A significant number of consumers, in other words, like being able to simply tune to a station knowing that, for the most part, they will enjoy what gets played.

Thus, linear programming can fit many consumers' lifestyles well and meet their expectations because the ease of use can somewhat compensate for the lack of flexibility and inability to personalize programming that is an inherent limitation of traditional broadcasting. However, many consumers would still like to have programming that is better personalized to their individual tastes, while perhaps getting some of the interactivity such as purchase opportunities provided by non-linear access methods, but all the while having it as easy to use and consume as traditional linear radio and television programming.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A media content programming, delivery, and consumption model is provided by which consumers can receive media content programming that is personalized to their tastes and interests and discover new media content that they will likely enjoy, without having to put in a lot of effort or needing to be technically adept. The received media content programming can then be played, for example, on a PC or portable media player. This model enables consumers to access the media content programming from a service with the same ease as tuning to a radio station, and then to simply enjoy the programming without needing to take any additional steps, much like they consume traditional linear programming. However, unlike traditional linear programming, the programming here is curated so that the delivered content is highly relevant to the consumer. In addition, consumers of the service can navigate within a programmed sequence of media content, for example, by skipping ahead or going back in a playlist, as well as learning more about particular content by interacting with rich metadata that is associated with the content.

Under the model, a playlist comprising media content in a programmed sequence is generated by taking a variety of curating factors into account. Illustrative examples of such factors include analysis of media content that other people who use the service are consuming (including those who fall within the consumer's social graph, i.e., the network of connections and relationships among people using the service including friends of the consumer, and friends of friends, etc.); the likes and dislikes of the consumer that are identified to the service (e.g., the consumer's favorite songs or movies, DJs that are liked, favorite radio stations, songs on a playlist that the consumer skips over); identified media content that is consumed (e.g., the consumer's top 10 most listened-to songs) or owned by the consumer (e.g., album or movie collections); and, other user-profile or service usage-based factors.

The media content programming may be delivered over a network such as the Internet to a PC to be rendered and consumed locally by a consumer, remotely accessed as a web-hosted service, or transferred and cached for later playback on a portable media player when the consumer is on the go. Typically, the delivery of the media content will be subject to certain limitations in accordance with the terms of use of the service, and/or to meet digital rights management ("DRM") arrangements, or other license or contract obligations that are in place between the service provider and the media content owners.

When the present media content programming is stored on a device such as a PC, or cached in a personal media player, the media content will typically be consumed (i.e., played or rendered) in a linear manner in a pre-defined programmed sequence (i.e., the playlist). However, unlike traditional programming the consumer is provided with an ability to skip ahead or go back in the playlist (for example, to skip a song that is not liked, or hear a song again that is). In some cases, there will be some limits on how the consumer may skip ahead or go back in the playlist, again as may be required by terms of use or to meet license and/or DRM obligations. Consumers may be provided with an ability to interact with the media content as it plays, for example, by flagging a piece of media content for later download and/or purchase, or by accessing rich metadata that is related to the media content (e.g., album cover artwork, artist information, concert information and news from live feeds, reviews by other consumers or friends, "bonus," "box set," or "extras" features, etc.). Consumers may also be provided with an easy way to rate the media content as it is played (by providing for example, a simple "thumbs up" or "thumbs down" indication) so that the service can learn from the user feedback to help further refine or tailor the media content programming to better meet consumers' tastes.

Several different business models can be used with the present media content programming, delivery, and consumption model. For example, the model can support a subscription-based or advertisement-based service, or a combination of both. Subscriptions can also include various tiers or levels, including trial, limited consumption, or unlimited consumption service levels, for example.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in drawings. Elements are not drawn to scale unless otherwise indicated.

DETAILED DESCRIPTION

The present media content programming, delivery, and consumption model makes use of the observation that a significant number of consumers of media content, such as music and video, want the content to be delivered in a way that does not require a lot of work or effort to enjoy. For example, these consumers will often simply tune in a radio station they like and listen to the programming that is aired. Perhaps the radio plays in the background as they perform other tasks and activities, or a consumer pays close attention to a speech or interview that is being played, but in all cases the consumers rely on the radio station to make the choices of music or other content for them.

But these traditional delivery arrangements are often very satisfactory because it is further recognized that while some consumers enjoy and listen to music, they are really only casual listeners. Such listeners can be quite different from sophisticated listeners who are "into" music and tend to be very knowledgeable and discriminating about their music choices and invest time and effort to fulfill their particular tastes. Yet other consumers might have limited time, or are just not inclined to invest more effort beyond using the radio to find and access media content to experience. In fact, given the large number of choices among media content and sources, some consumers may prefer to let others make choices for them.

The example above is part of an emerging trend which is referred to here as "curated consumption" where consumers like to follow curators of style, taste, or fashion in making purchasing and consumption decisions for a variety of products and services. While the term "curator" traditionally refers to a collection specialist at a gallery, museum, or library, it is becoming increasingly common for magazines, television, radio, print advertising, web sites, blogs (web logs), and other media outlets to team with retailers, experts, celebrities, or other personalities to offer branded products or services, generate "top ten" lists, "staff picks" and other recommendations, and provide product/service reviews in order to influence and shape consumer culture.

The present arrangement extends the concept of curated consumption to a media content programming, delivery, and consumption model supporting a service that may be used by casual and sophisticated consumers alike. Casual consumers can receive a curated media content program that fits their tastes and which plays on their PC and/or portable media player as easily as using a traditional linear programming source such as radio. And sophisticated consumers can satisfy their desire to dig deeper and learn more by interacting with the rich metadata.

Figure 1:
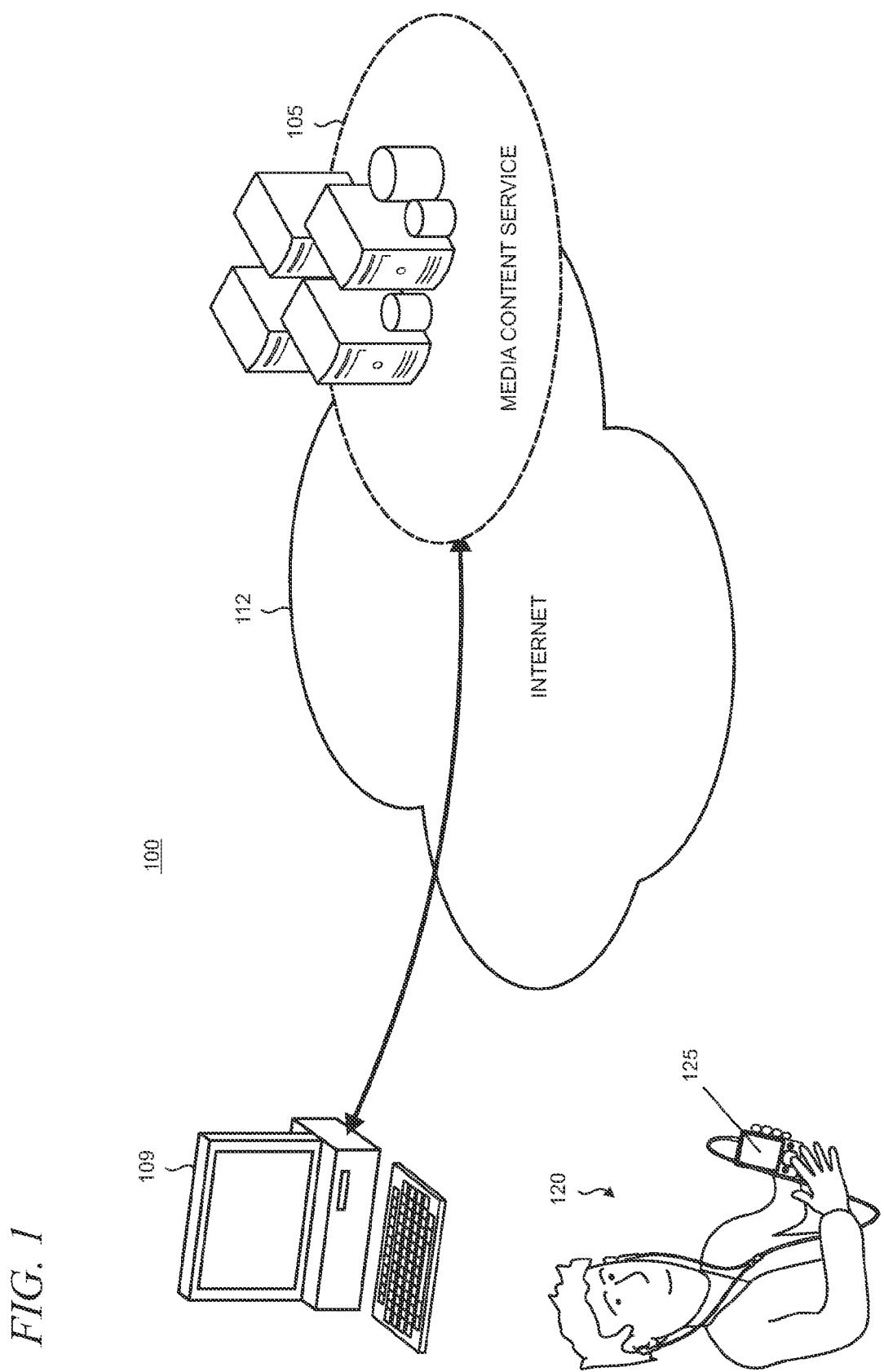
FIG. 1 shows an illustrative environment in which the present media content programming, delivery, and consumption model may be practiced.

Turning now to the drawings, FIG. 1 shows an illustrative environment 100 in which the present media content programming, delivery, and consumption model may be practiced. A media content service 105 is arranged as a cloud-based service that may be accessed from a PC 109 via public networks such as the Internet 112. PC 109 is commonly located in a home or office which a consumer 120 can utilize to store, organize, access, and render various types of media content in digital form. Such content commonly includes, for example, music, audio books, podcasts, images like photographs, video in the form of television programs, movies, music videos, and the like. As shown in FIG. 1, consumer 120 also uses a portable media player 125 that is typically arranged to render most types of media content when the consumer is away from the PC 109.

Portable media player 125 is representative of the variety of personal electronic devices that are available that can play audio, video, or both, including MP3 players (Moving Pictures Expert Group, MPEG-1, audio layer 3), portable multimedia players, pocket PCs, smart phones, mobile phones, handheld game devices, personal digital assistants ("PDAs"), or other types of electronic devices that can store and render media content. And while a PC 109 is shown in the illustrative environment 100 in FIG. 1, other devices may also be used to access the media content service 105 such as laptop and handheld computers, multimedia centers, game consoles, set-top boxes, network devices such as servers and access points, and the like. In addition, while both audio and video are commonly consumed, and devices are often configured to render both, the present arrangement for media content programming may be arranged to work with either audio or video, or both audio and video as may be needed by a particular scenario.

Figure 2:
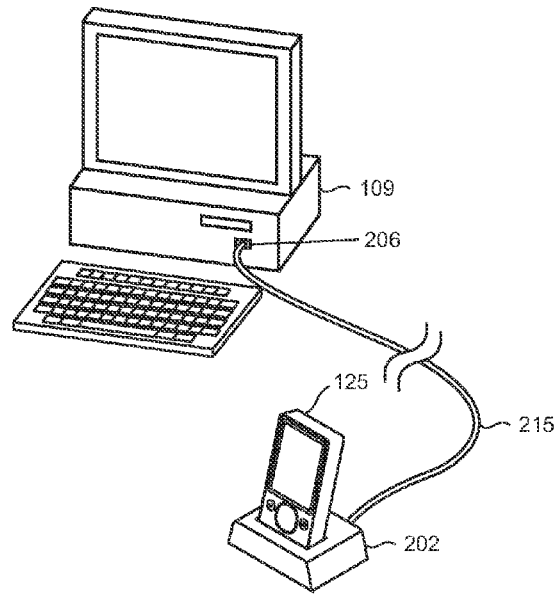
FIG. 2 shows an illustrative portable media player that is inserted into a dock for synchronization with a PC.

In this example, the portable media player 125 is arranged to be operatively couplable with the PC 109 using a host-client synchronization process by which data may be exchanged or shared between the devices. FIG. 2 shows the portable media player 125 as typically inserted into a dock 202 for synchronization with the PC 109. Dock 202 is coupled to an input port 206 such as a USB (Universal Serial Bus) port with a synchronization ("sync") cable 215, in this example. In alternative arrangements, the portable media player 125 may be coupled directly to the sync cable 215 without using the dock 202. In addition, other arrangements may also be used to implement communications between the portable media player 125 and PC 109 including, for example, those employing wireless protocols such as Bluetooth, or Wi-Fi (i.e., the Institute of Electrical and Electronics Engineers, IEEE 802.11 standards family).

Figure 3:
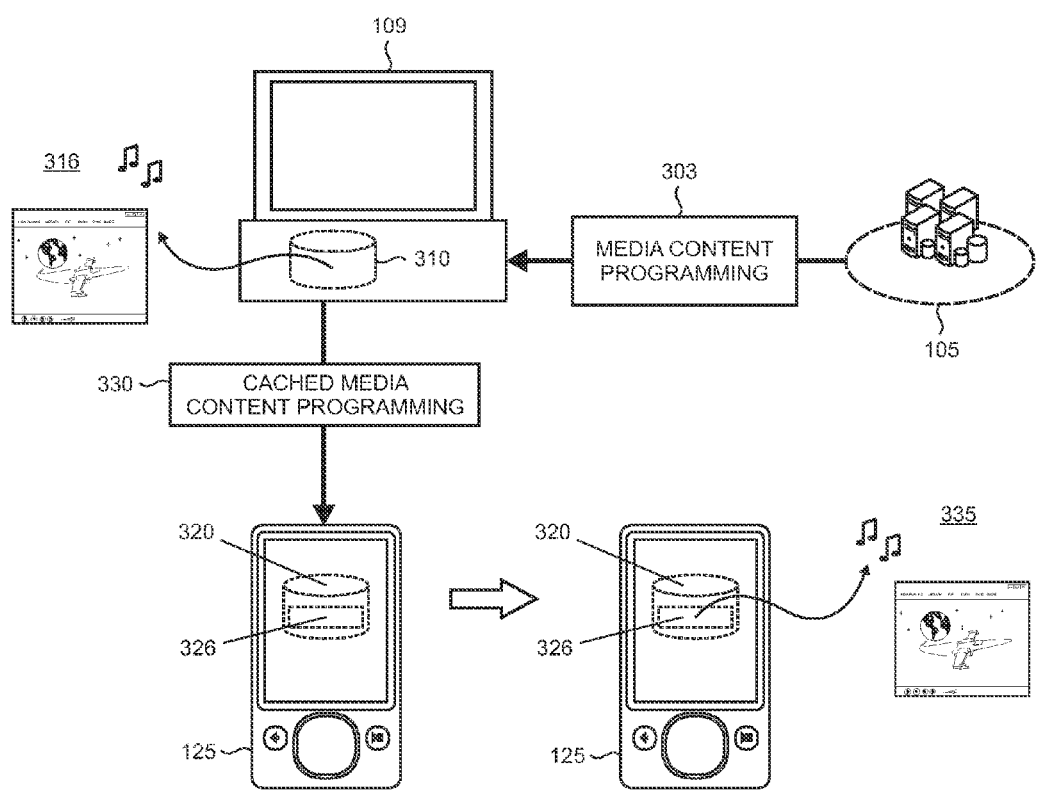
FIG. 3 shows an illustrative flow of media content programming from a service to a PC and a portable media player.

As shown in FIG. 3, media content programming 303 which is personalized to the consumer 120 is provided by the service 105 to the PC 109. In one example, the media content programming 303 from the service 105 is stored to a persistent storage medium such as a hard disk 310. The media content programming 303 can then be rendered by the PC 109 off the hard disk 310 so that programming such as music and/or videos (collectively indicated by reference numeral 316) can be played and enjoyed by the consumer 120.

Another way that the consumer 120 can consume the media content programming 303 is by transferring the content from the PC 109 into a cache 320 that is typically arranged as a portion of the persistent storage device 326 that is utilized in the portable media player 125. The transferred and cached media content programming 330 is then available so that programming such as music and/or videos (collectively indicated by reference numeral 335) can be rendered out of the cache 320 when the portable media player 125 is disconnected from the PC 109 and used as a standalone device.

Figure 4:
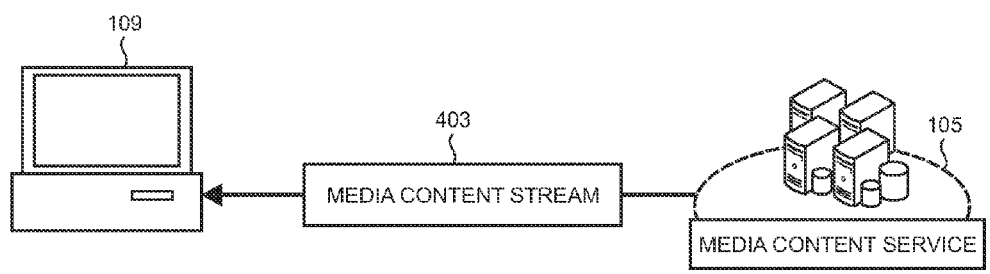
FIG. 4 shows an illustrative media content stream that is provided as a web-hosted service to enable remote access from a PC.

Media content programming may also be streamed to the PC 109 from the service 105, as shown in FIG. 4. Here, the media content stream 403 is typically not stored locally on the PC 109. Instead, the media content is accessed remotely, for example, as a web-based streaming service.

It is emphasized that the media content programming from the service 105 is typically provided as an additional choice to the consumer 120 to supplement existing media content. Thus, for example, the consumer 120 can listen to songs from the music collection stored on the PC 109 or personal media player 125 in a normal fashion, and then switch to a programmed playlist from the service 105. In some cases, the consumer 120 can receive multiple programmed playlists from the service 105 and then switch among programmed playlists in an analogous manner to tuning in to different radio stations. Of course, the consumer 120 is free to switch from a programmed playlist back to consuming stored media content from his collection in a conventional manner.

Figure 5:
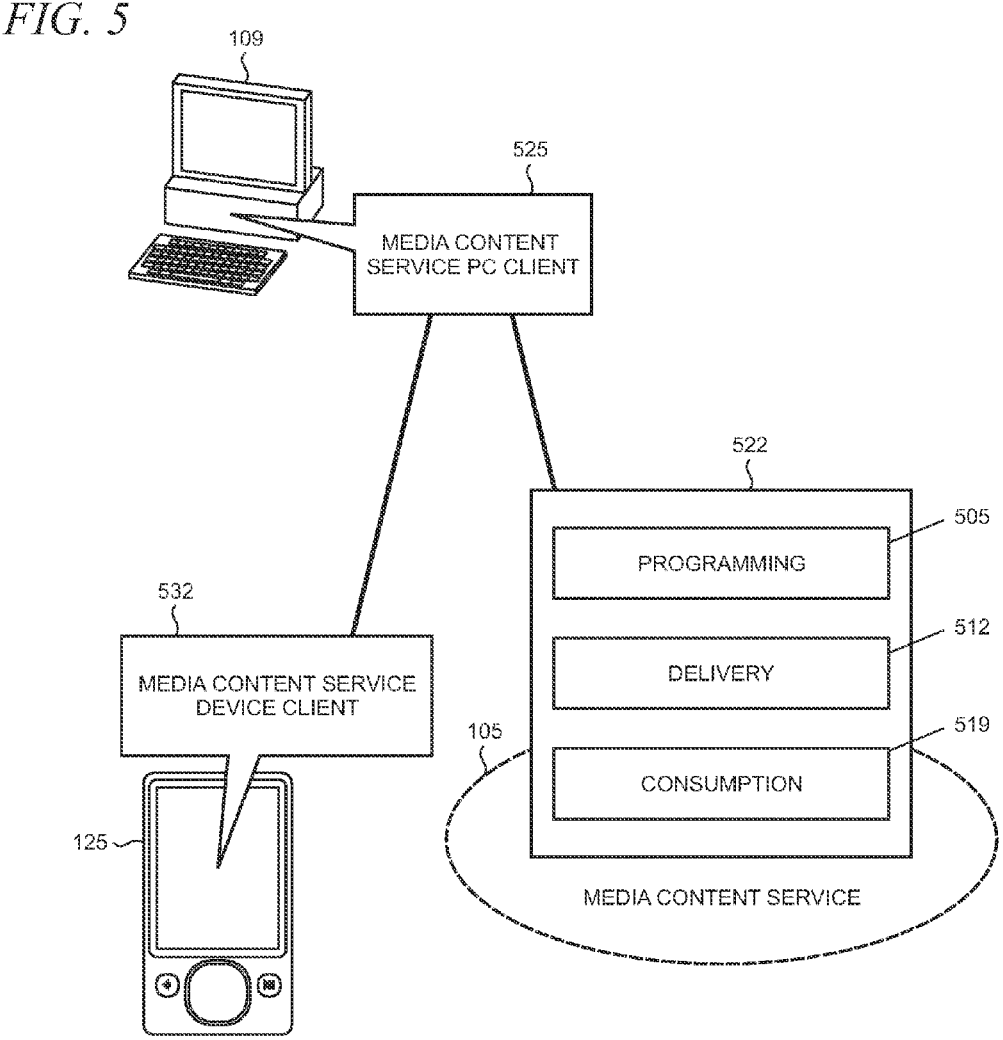
FIG. 5 shows a set of illustrative components that are used to implement the media content service.

FIG. 5 shows a set of illustrative components that are used to implement the media content service 105. On the service side, three functional components including a programming component 505, a delivery component 512, and a consumption component 519 are provided. These service-side components 522 are configured to interface with respective client-side components 525 and 532 on the PC 109 and portable media player 125.

The client-side components 525 and 532 on the PC 109 and portable media player 125, respectively, are configured to locally implement the various features and functionalities provided by the service 105. For example, the client-side PC component 525 may be arranged to interact with the service 105 to receive the media content programming 303 and store it on the hard disk 310, as well as provide a user interface with which, for example, the consumer may interact with the content (as described below in the text accompanying FIG. 8), or set global preferences to be used by the service 105. This user interface may be implemented as an application, or be configured as an API (application programming interface), for example, to interface with other applications that may be running on the PC 109. The client-side PC component 525 may also be configured to monitor user activities as they interact with their media content programming for purposes of collecting user-feedback, as well as enforce terms of use and/or licensing arrangements.

The client-side PC component 525 is further arranged to interact with the client-side device component 532 to effectuate transfer of the cached media content programming 330 from the PC 109 to the portable media player 125.

In addition to providing the functionality attendant to the transfer and caching of the media content programming 330, the client-side PC component 525 will typically provide control and user interface functions to enable the consumer 120 to render and interact with the media content on the portable media player 125. These controls and interface functions may be implemented using an interface or API to components which support existing user interface and controls (e.g., buttons and display screen) that are supported by the portable media player 125. Monitoring, feedback collection, and enforcement of terms of use and applicable license restrictions are also typical functionalities that are implemented on the client-side device component 532.

Figure 6:
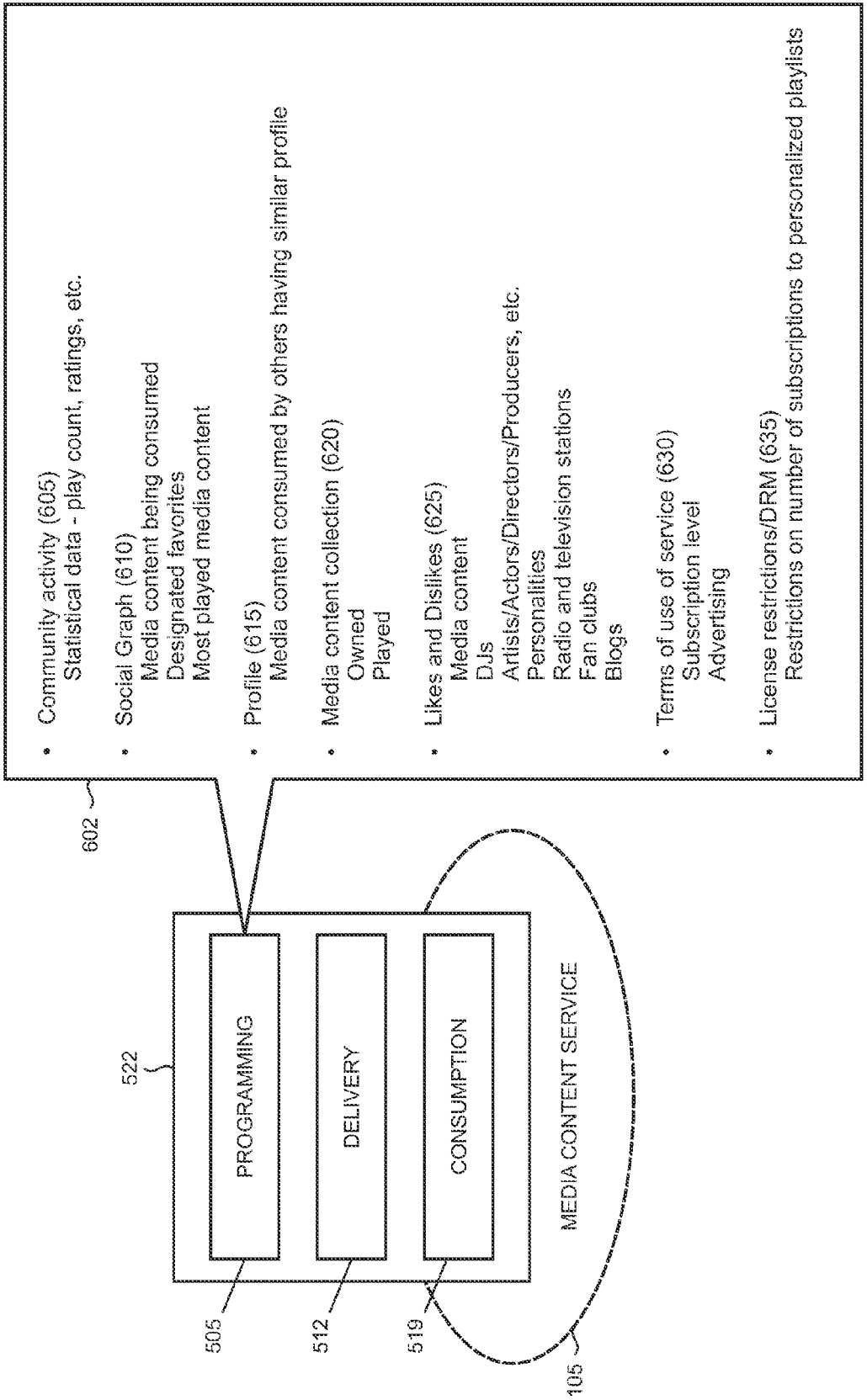
FIG. 6 shows details of the programming component of the media content service.
Figure 7:
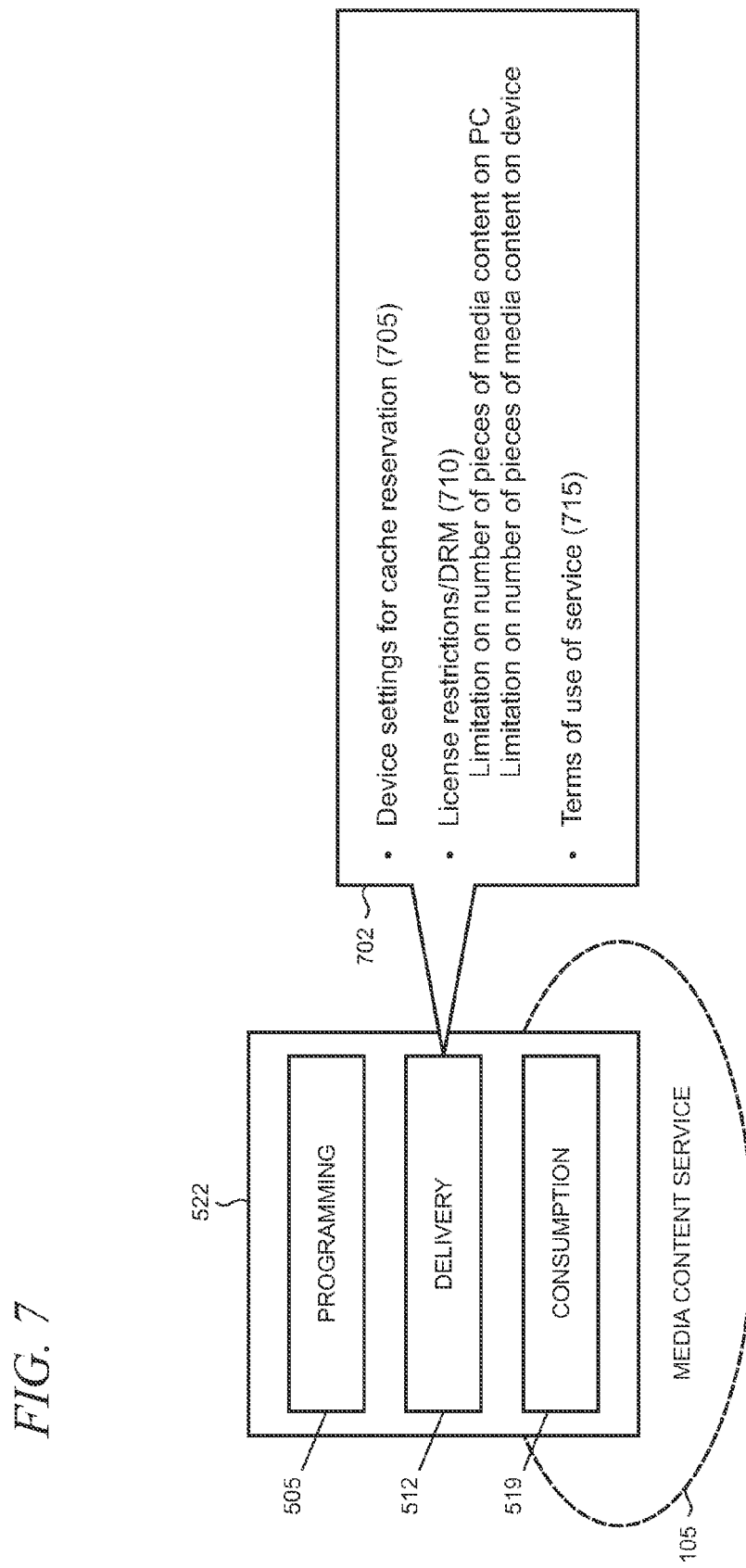
FIG. 7 shows details of the delivery component of the media content service.
Figure 8:
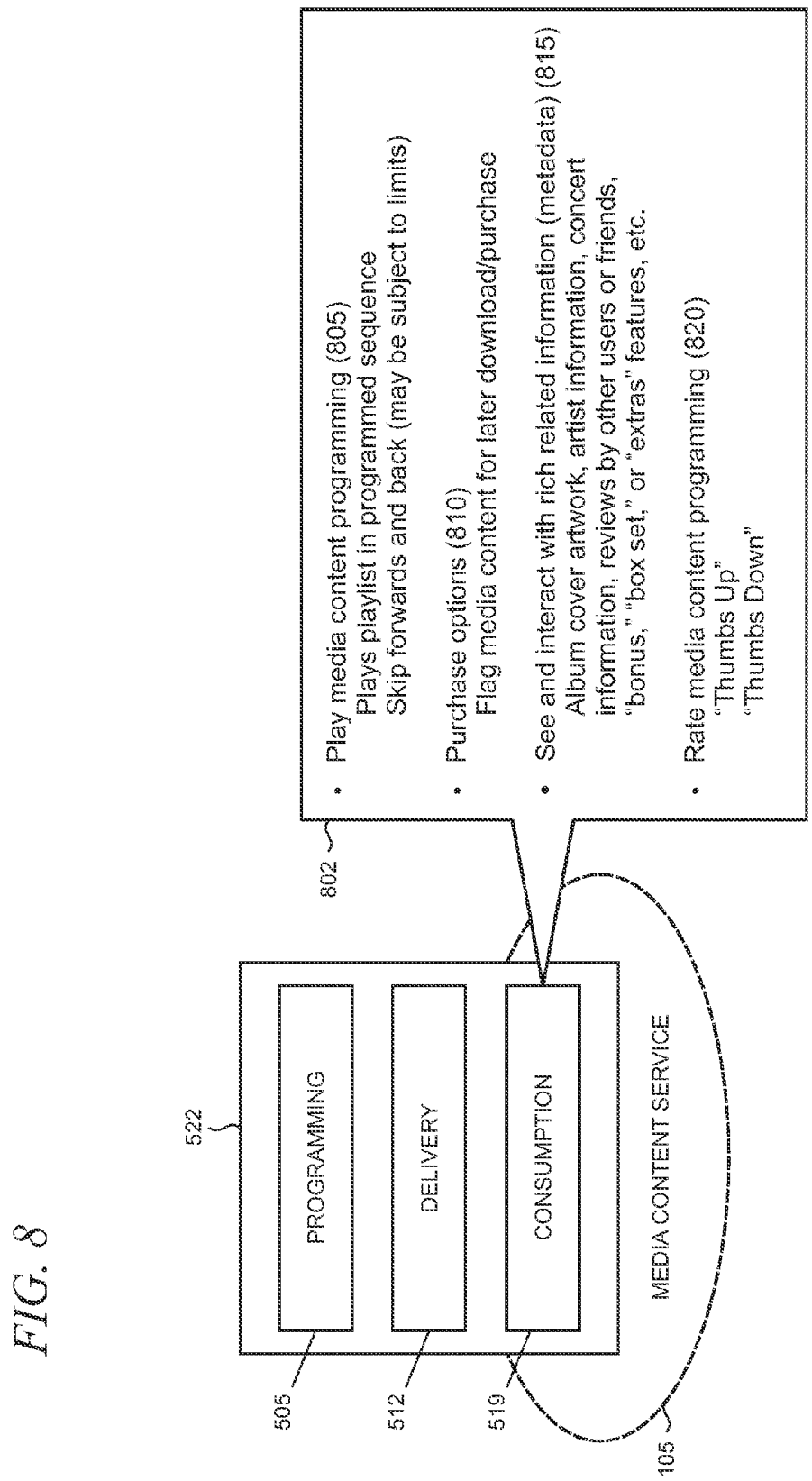
FIG. 8 shows details of the consumption component of the media content service.

Turning now to FIGS. 6-8, the service-side components 522 are described in more detail. As shown in FIG. 6, a variety of factors 602 may be utilized by the programming component 505 when selecting the particular media content that is used in a given programmed playlist. It is emphasized that the factors 602 are illustrative, they can be weighted in different ways, and other factors may also be utilized as required to meet the needs of a particular application, and to provide curated experiences to consumers that are well suited to their tastes. In addition, it is not necessary that all the factors shown in FIG. 6 be used in all implementations of the present media content programming.

In one illustrative example, the factors 602 will be utilized and weighted by a selection algorithm that is configured to operate in an automated manner as part of the programming component 505 in the service 105. In alternative arrangements, the algorithm may be configured to be manually adjusted or tuned to produce a particular result. The balance between automated and manual selection may be varied to meet the requirements of a particular implementation.

Generally, the activity among the community of users of the service 105, along with the activities of the specific consumer and those within the consumer's social graph will form a basis for the programming. More specifically, the community activity 605 will typically comprise statistical data that is collected by the service 105 with regard to various usage attributes that are associated with particular pieces of media content. Such statistics could include, for example, the overall play count of the songs that are provided by the service 105, ratings of the songs that are collected as user-feedback, and other data that is collected from the community of service users as a whole.

The social graph factor 610 takes into account the activities of other people who use the service 105 who are identified as being within the consumer's social graph. Typically, the consumer will identify friends or be identified by others as a friend, or have some other connection or relationship that can be identified. Thus, the consumer's social graph could extend to people who have expressed interests in common music or film genres, or who may be members of the same artist fan club that is hosted by the service 105. So, for example, the social graph factor 610 can include those songs that are being listened to by the consumer's friends, the favorite songs of friends, which songs are most played by friends, and so on.

The profile factor 615 considers the profile of the consumer and looks to media content that is consumed by other consumers of the service 105 having similar profiles. A user profile will commonly consider demographic information such as age, gender, education, residency, hobbies/interests, and similar factors that may be furnished by the consumer, either as part of a service sign-up process, or that are explicitly provided to help the service 105 program the playlist.

Assuming permission is received to do so, the media content collection factor 620 looks to the types and genres of media content that the consumer either owns (for example, music stored on the hard disk 310 on PC 109), or the media content that the consumer plays (either through the service 105, or via other sources such as Internet radio, for example) but does not own. The consumer's collection of media content can often be expected to provide a good basis for programming because similar artists and genres to those in the collection can often be readily identified.

The likes and dislikes factor 625 can consider a variety of subjects that the consumer can explicitly designate to the service 105 as being liked or disliked, or can implicitly indicate such likes and dislikes through some action (for example, by repeatedly skipping and not listening to a particular artist or song when it comes up in a programmed playlist). The subjects listed in FIG. 6 are illustrative, and include the consumer's like or dislike of particular media content (such as songs or movies), DJs, artists, actors, producers, directors, famous personalities or celebrities, radio or television stations, fan clubs hosted by the service 105, and user comments or blogs that are posted in forums supported by the service 105.

The remaining factors shown in FIG. 6 are generally related to the commercial context in which the service 105 operates. The terms of use factor 630 will typically take into account the business model used by service 105 which may include both advertisement-based and subscription-based business models.

Advertising can be dynamically inserted into a playlist as it is generated. For example, with multi-leveled or tiered subscriptions, playlists associated with free or less expensive subscriptions may utilize more advertising, while those associated with more expensive subscriptions may have fewer advertisements or none at all.

The license restriction factor 635 (which may include accommodation for various DRM schemes) may also be considered when programming media content into a playlist. For example, depending on the terms of the agreements that are in place between the provider of the service 105 and the media content owners, there could restrictions imposed on the number of playlists to which a given consumer may subscribe and thus receive at the PC 109 and/or transfer and cache on the portable media player 125.

FIG. 7 shows details of the delivery component 512 of the service 105. As indicated by reference numeral 702, the delivery component 512, in operative combination with respective client-side PC and device components 525 and 532, is utilized to implement device settings 705, and enforce certain license and/or DRM restrictions 710. In this example, the device settings include an indication of the space that will typically need to be reserved on the cache 320 in the portable media player 125 to be able to accommodate the cached media content programming 330. Such indication can be helpful when the PC 109 and portable media player 125 are synchronizing to avoid any problems with the cached programming potentially overwriting other content that may be stored on the persistent storage device 326. For example, if the reservation exceeds the free space on the storage device 326, an alert or error message can be delivered to the consumer 120 via user interfaces supported by either the media content service PC or device clients 525 and 532.

The license restrictions 710 may be utilized in some cases to restrict the number of pieces of media content (i.e., number of songs or videos) that are delivered from the service 105 to the PC 109, as well as limiting the transfer and caching of content to the portable media player 125. As with programming component 505, such license restrictions could be imposed as may be required by the terms of agreements between the provider of the service 105 and the media content owners. Similarly, the terms of use of the service 715 can restrict delivery, transfer, and caching according to subscription level, for example.

FIG. 8 shows details of the consumption component 519 of the service 105. As indicated by reference numeral 802, the consumption component, in operative combination with respective client-side PC and device components 525 and 532, supports the user experience at the PC 109 and portable media player 125 when consuming the media content that is programmed and delivered as described above.

As indicated by reference numeral 805, the consumer 120 will typically play the playlist in its programmed sequence, which results in a similar experience to that of traditional linear programming. However, in many implementations, the consumer 120 will be enabled with the ability to navigate within the programmed sequence of media content, for example, by skipping ahead or going back in a playlist. In some cases, multiple preset navigation points may be located in a programmed sequence that set the place where playback resumes when the consumer skips ahead or goes back. There might also be limitations imposed as to when, or how often, the consumer 120 may skip or go back in accordance with license/DRM obligations and/or the terms of use of the service 105. For example, there may be limits on the total play count of songs, or the consumer 120 may not be allowed to skip advertising.

As indicated by reference numeral 810, as the playlist is rendered, the consumer 120 may interact with the user interface provided by the respective client-side PC and device components 525 and 532 to flag a particular piece of media content. For example, if the consumer 120 hears a song or views a video clip that is liked, that media content may be flagged so that the consumer can later be provided with options to purchase and download the content for playback on an unrestricted license or ownership basis, for example.

Access to rich metadata is also provided in the user experience, as indicated by reference numeral 815. In this case, the consumer 120 is provided with an option to see and interact with a variety of information that is related to a particular piece of media content. For example, as a song in the playlist plays, the consumer 120 may operate the user interface on the PC 109 or portable media player 125 to look at the artwork for the song's album, read a biography of the artist or band performing the song, read the lyrics and liner notes, and see the artist's discography. The consumer 120 might also read reviews of the song, album, and/or artist from other users of the service 105, from friends on the service, or from professional reviewers and critics that write for contemporary magazines or blogs. Similar kinds of information can also be viewed for video content.

Other features of the type and kind that are often packaged with special editions of music or videos as "extra" or "bonus" features, or that are retailed as "box sets" can also be supported in the accessible rich metadata. These can include, for example, interviews with the artists, actors, and directors, commentary, bloopers, behind the scenes footage, outtakes, remixes, and similar kinds of content. Consumers often value these extra features and find them as an appealing way to learn more about the media content. Such features can be expected to be available for both audio and video content.

The rich metadata 815 can also include live feeds that reflect current or dynamically changing information such as concert dates or news items about an artist, band, or actor. Additional interfaces or portals to enable purchasing of related items such as concert tickets or merchandise tie-ins may also be supported.

Casual users of the service 105 may be expected to find the rich metadata 815 as an easy way to access resources that offer fun and interesting supplements to the media content. Sophisticated users will typically find their needs met by the depth and breadth of the additional related information that they might not be able to find from other resources. For example, media content owners might agree, as part of their agreements with the provider of the service 105, that certain related information or extra features be exclusively available on the service.

As indicated by reference numeral 820, the consumer 120 is further provided with a rating facility to rate a programmed playlist or its constituent elements such as individual songs or videos. Typically, this rating facility will be implemented using a simple rating methodology, for example with a "Thumbs Up" or "Thumbs Down" paradigm. The user feedback provided by the ratings may enable further refinement of playlists to meet the consumer's tastes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium that does not consist of a signal, said computer-readable storage medium containing instructions which, when executed by one or more processors disposed in an electronic device, cause the electronic device to perform a method for interacting with media content received via a host device from a media content service accessed by a community of users, the method comprising the steps of:

receiving, from the host device, the media content arranged in a form of a play list comprising a linear programmed sequence in which the media content is to be rendered by the electronic device, the playlist being programmed by the media content service to personalize the play list to a particular consumer based on activity among the community of users, activities of the particular consumer, and activities of other consumers of the media content service within a social graph of the particular consumer who have been identified by the particular consumer as friends and who have identified the particular consumer as a friend;

storing the received media content on the electronic device;

providing a user interface enabling the particular consumer to play the media content, read reviews of the media content from friends, and input navigation commands for navigating within the linear programmed sequence, the navigating including skipping ahead to a first point in the linear programmed sequence or going back to a second point in the linear programmed sequence;

executing the navigation commands so that the electronic device renders the media content from at least one of the first point or the second point in the linear programmed sequence;

identifying media content in the playlist which is skipped as being disliked by the particular consumer;

limiting how often the particular consumer may skip media content in the playlist;

collecting information that is specific to the particular consumer, the information comprising media content on the electronic device and likes and dislikes of the particular consumer based on media content which is consumed by the particular consumer; and providing the information to the host device when the electronic device is connected to the host device for delivery to the media content service over a network.

2. The computer-readable storage medium of claim 1 further containing instructions for enforcing terms of use of the media content service that require the particular consumer to play advertising in the playlist.

3. The computer-readable storage medium of claim 1 further containing instructions for enforcing limitations of digital rights management or licensing schemes that pertain to the media content.

4. The computer-readable storage medium of claim 1 further containing instructions for accepting user input from the user interface that flags media content for purchase.

5. The computer-readable storage medium of claim 4 further containing instructions for providing a portal to a facility for effectuating the purchase.

6. A portable media player comprising:

at least a memory and a processor configured to utilize instructions in the memory to implement:

an interface for communicating with a host device and receiving media content arranged in a form of a play list from the host device, the play list being programmed by a media content service accessed by a community of users, the play list being personalized to a particular consumer based on activity among the community of users, activities of the particular consumer, and activities of other consumers of the media content service within a social graph of the particular consumer who have been identified by the particular consumer as friends and who have identified the particular consumer as a friend;

a cache arranged for caching the playlist to enable the portable media player to render the media content in the playlist when the portable media player is disconnected from the host device; and a user interface enabling the particular consumer to play the media content, read reviews of the media content from friends, and input navigation commands for navigating forwards or backwards to a preset navigation point in the playlist, wherein media content in the playlist which is skipped is identified as being disliked by the particular consumer, and the user interface imposes a limit on how often the particular consumer may skip media content in the playlist;

the instructions configured to, when executed by the processor, cause the portable media player to at least:

collect information that is specific to the particular consumer and store the information in the memory, the information comprising media content on the portable media player and likes and dislikes of the particular consumer based on media content which is consumed by the particular consumer; and provide the information to the host device when the portable media player is connected to the host device for delivery to the media content service over a network.

7. The portable media player of claim 6 wherein the host device comprises one of a PC, game console, set-top box, or network access point.

8. The portable media player of claim 6 wherein the playlist comprises a linear programmed sequence and metadata that is related to the media content, the metadata including the reviews of the media content from the friends of the particular consumer.

9. The portable media player of claim 6 wherein the portable media player comprises one of a PDA, smart phone, mobile phone, MP3 player, multimedia player, game device, or handheld computer.

10. The portable media player of claim 6 wherein the interface comprises one of a wired interface or wireless interface.

11. The portable media player of claim 6 wherein the media content comprises at least one of audio content or video content, the audio content comprising one or more of music, an audio book, a podcast, news content, or commentary content, the video content comprising one or more of a television program, a music video, a video clip, a movie, or a feature film.

12. A method performed by a portable media player for interacting with media content, the method comprising:
    establishing a connection to a host device;
    receiving media content arranged in a form of a play list from the host device, the playlist being programmed by a media content service accessed by a community of users, the play list being personalized to a particular consumer based on activity among the community of users, activities of the particular consumer, and activities of other consumers of the service within a social graph of the particular consumer who have been identified by the particular consumer as friends and who have identified the particular consumer as a friend;
    caching the playlist on the portable media player;
    rendering a user interface on the portable media player when the portable media player is disconnected from the host device, the user interface enabling the particular consumer to play the media content, read reviews of the media content from friends, and input navigation commands for navigating forwards or backwards to a preset navigation point in the playlist;
    identifying media content in the playlist which is skipped as being disliked by the particular consumer;
    limiting how often the particular consumer may skip media content in the playlist;
    collecting information that is specific to the particular consumer, the information comprising media content on the portable media player and likes and dislikes of the particular consumer based on media content which is consumed by the particular consumer; and
    providing the information to the host device when the portable media player is connected to the host device for delivery to the media content service over a network.

13. The method of claim 12, wherein the media content that is programmed into the playlist is responsive to statistics pertaining to the community of users.

14. The method of claim 12 further comprising receiving metadata associated with the media content in the playlist from the host device, the metadata including the reviews of the media content from the friends of the particular consumer.

15. The method of claim 12, wherein receiving the playlist from the host device is subject to terms of use between the particular consumer and the media content service.

16. The method of claim 15, wherein the terms of use support at least one of:
    an advertising-based business model, and
    a subscription-based business model.

17. The method of claim 15, wherein the terms of use include at least one of:
    licensing terms with one or more owners of the media content, and
    digital rights management restrictions that are applicable to one or more pieces of media content in the playlist.

18. The method of claim 15, wherein the terms of use include at least one of:
    a limitation on a number of playlists to which the particular consumer subscribes, and
    a limitation on a number of playlists which are delivered to the portable media player.

* * * * *